(12) United States Patent
Hendrickson et al.

(10) Patent No.: US 7,218,009 B2
(45) Date of Patent: May 15, 2007

(54) DEVICES, SYSTEMS AND METHODS FOR GENERATING ELECTRICITY FROM GASES STORED IN CONTAINERS UNDER PRESSURE

(75) Inventors: James A. Hendrickson, Freedom, PA (US); Roy D. Marangoni, Pittsburgh, PA (US); Matthew J. Palamara, Pittsburgh, PA (US)

(73) Assignee: Mine Safety Appliances Company, Pittsburgh, PA (US)

( * ) Notice: Subject to any disclaimer, the term of this patent is extended or adjusted under 35 U.S.C. 154(b) by 108 days.

(21) Appl. No.: 11/093,964

(22) Filed: Mar. 30, 2005

(65) Prior Publication Data
US 2005/0217275 A1    Oct. 6, 2005

(51) Int. Cl.
*F03B 13/00* (2006.01)
(52) U.S. Cl. .................. 290/1 R; 290/1 A; 290/54
(58) Field of Classification Search .......... 290/1 R, 290/1 A, 43, 54; 340/517; 310/90
See application file for complete search history.

(56) References Cited

U.S. PATENT DOCUMENTS

| | | | | |
|---|---|---|---|---|
| 4,208,592 A |   | 6/1980 | Leibow et al. | |
| 4,453,537 A | * | 6/1984 | Spitzer | 623/3.12 |
| 4,511,806 A | * | 4/1985 | May | 290/43 |
| 4,678,922 A | * | 7/1987 | Leininger | 290/54 |
| 4,688,025 A | * | 8/1987 | Frank | 340/571 |
| 4,731,545 A | * | 3/1988 | Lerner et al. | 290/54 |
| 4,821,767 A | * | 4/1989 | Jackson | 137/491 |
| 5,016,627 A | * | 5/1991 | Dahrendorf et al. | 128/205.24 |
| 5,553,454 A | * | 9/1996 | Mortner | 60/409 |
| 5,781,118 A | * | 7/1998 | Wise et al. | 340/632 |
| 5,801,454 A | * | 9/1998 | Leininger | 290/54 |
| 5,969,429 A | * | 10/1999 | Rudolph et al. | 290/54 |
| 6,107,692 A | * | 8/2000 | Egri et al. | 290/43 |
| 6,198,396 B1 | * | 3/2001 | Frank | 340/573.1 |
| 6,486,473 B2 | * | 11/2002 | Salapow et al. | 250/330 |
| 6,555,926 B2 | * | 4/2003 | Gondron | 290/1 R |
| 6,784,559 B1 | * | 8/2004 | Simonds | 290/1 R |

FOREIGN PATENT DOCUMENTS

| | | |
|---|---|---|
| DE | 19728319 | 1/1999 |
| DE | 19729965 | 1/1999 |
| DE | 10007865 | 9/2001 |

\* cited by examiner

*Primary Examiner*—Nicholas Ponomarenko
(74) *Attorney, Agent, or Firm*—James G. Uber; Henry E. Bartony, Jr.

(57) ABSTRACT

A breathing system includes a container to store a gas under pressure, wherein the gas includes air or oxygen. The container includes an outlet through which the gas exits the container. The breathing system further includes a generator system including a generator in operative connection with the container outlet such that energy is supplied to the generator by the pressurized gas. The generator converts the energy supplied by the pressurized gas to electrical energy. The system further includes a fluid path in connection with the generator through which pressurized gas passes after providing energy to the generator and a respiration facepiece in fluid connection with the fluid path.

10 Claims, 15 Drawing Sheets

Integral, first stage regulator

DEVICES, SYSTEMS AND METHODS FOR GENERATING ELECTRICITY FROM GASES STORED IN CONTAINERS UNDER PRESSURE

FIELD OF THE INVENTION

The present invention relates generally to devices, systems and methods for generating electricity from gas stored in a container under pressure, and especially, to devices systems and methods for generating electricity from pressurized air delivered to a self-contained breathing apparatus.

BACKGROUND OF THE INVENTION

A generator and a motor are essentially the same device mechanically. The term applied to a particular device depends on whether (i) electricity is input into the device to cause rotation of an armature (a motor) or (ii) energy is produced by the device by spinning an armature by an input torque (a generator). Generators (both DC and AC) use magnets to transform mechanical energy into electrical energy via magnetic induction. Generators have a main magnetic field, which can be produced by a permanent magnet or by a coil called a field winding located in the stator or the rotor. Conductors make up the armature winding (coil) which is usually on the rotor. When the rotor rotates the conductors cut or pass through the field. The moving of the conductors through the magnetic field causes induction to take place and a voltage to be generated in the coil. Each end of this coil can, for example, be connected to a metal band called a slip ring. Small brushes made up of carbon on metal pick up the voltage off the rings and transport it to the generator's terminals. DC generators are sometimes referred to as dynamos.

Many different type of energy have been used to rotate the armature of a generator. For example, generators have been powered by manual power, wind power, water power, and steam power (from, for example, the burning of fossil fuels). Additionally, U.S. Pat. Nos. 4,678,922 and 5,801,454 disclose air tools (for example, buffers, sanders, grinders and polishers, which include an air motor) including a generator which produces electricity from the flow of the pressurized air. The generator is integrated with the air motor of the air tool. The air tools can be provided with a light that is powered by the integral generator. The air tools can also include batteries and battery charging circuitry to store excess energy. In such air or pneumatic tools, pressurized/compressed air is typically provided from a powered compressor to the air tool solely to provide power to the air tool. The air (at a lower pressure) is then vented to the atmosphere without further use.

In a number of uses of gases, the gas is pressurized for storage in a relatively small volume (for example, in a gas cylinder as known in the art). Such container-stored gases are often used for purposes other than for storing mechanical energy in the form of a pressurized gas. For example, in a self-contained breathing apparatus (SCBA), a cylinder of compressed air is in fluid connection with a mask worn by the user. The compressed gas cylinder provides a source of breathable air/oxygen to the user of the SCBA for respiration in a hazardous environment. Similarly a self-contained underwater breathing apparatus (SCUBA) provides a source of breathable air/oxygen to a user of the SCUBA while under water.

It is common for a user of SCBA or SCUBA (or a user of a compressed gas container for other than respiration) to also use electrically powered items. For example, a firefighter equipped with a SCBA might also be equipped with a light source, a Personal Alert Safety System (PASS), and/or a thermal imaging camera such as disclosed in U.S. Pat. No. 6,486,473. As it is impractical to connect such devices to a power outlet via electrical wiring, such devices are typically equipped with batteries. The use of batteries adds extra weight and bulk to such devices. In general, the greater the power required and/or the longer the battery must provide power, the larger the battery must be and the more weight and bulk that is added to an individual (who may be already heavily laden with protective clothing and firefighting tools in the case of a firefighter).

To reduce or eliminate that above and other problems, it is desirable to develop alternative energy sources to provide electrical power.

SUMMARY OF THE INVENTION

In one aspect, the present invention provides a breathing system, including a container to store a gas under pressure, wherein the gas includes oxygen. The container includes an outlet through which the gas exits the container. The breathing system further includes a generator system including a generator in operative connection with the container outlet such that energy is supplied to the generator by the pressurized gas. The generator converts the energy supplied by the pressurized gas to electrical energy. The system further includes a fluid path in connection with the generator through which pressurized gas passes after providing energy to the generator and a respiration facepiece in fluid connection with the fluid path.

The generator system can include a housing including an inlet in fluid connection with the cylinder outlet and an outlet in fluid connection with the fluid path. The generator system can further include a mechanism for rotating a shaft of the generator. The mechanism can, for example, be a turbine in fluid connection with the housing inlet. The mechanism can also be a vane in operative connection with the housing inlet.

The generator system can further include a feedthrough connector on the housing to transmit electricity from the generator to outside of the housing. Moreover, the generator system can further include an energy storage mechanism. The generator can also include a voltage regulating mechanism. In one embodiment, the generator system is positioned within the gas cylinder.

In a further aspect, the present invention provides a gas container for holding a pressurized gas. The gas container includes an outlet through which pressurized gas can exit the gas cylinder and a generator system within the gas cylinder. The generator system includes a generator in operative connection with the container outlet such that energy is supplied to the generator by the pressurized gas before it exits the container outlet. The generator converts the energy supplied by the pressurized gas to electrical energy.

In another aspect, the present invention provides a system, including a container to store a gas under pressure. The container includes an outlet through which the gas exits the container. The system further includes a generator system including a generator in operative connection with the container outlet such that energy is supplied to the generator by the pressurized gas. The generator converts the energy supplied by the pressurized gas to electrical energy. The system also includes a fluid path in connection with the generator through which pressurized gas passes after providing energy to the generator.

In still another aspect, the present invention provides a system, including a container to store the gas under pressure and a generator system in operative connection with the container. The generator system includes a generator positioned within a housing. The housing includes an inlet in fluid connection with the cylinder outlet and an electrical outlet. Energy is supplied to the generator by flow of the pressurized gas through the housing inlet. The generator converts at least a portion of the energy supplied by the pressurized gas to electrical energy. The system further includes a fluid path in connection with the housing outlet through which pressurized gas passes after providing energy to the generator.

DETAILED DESCRIPTION OF THE INVENTION

Figure 1:
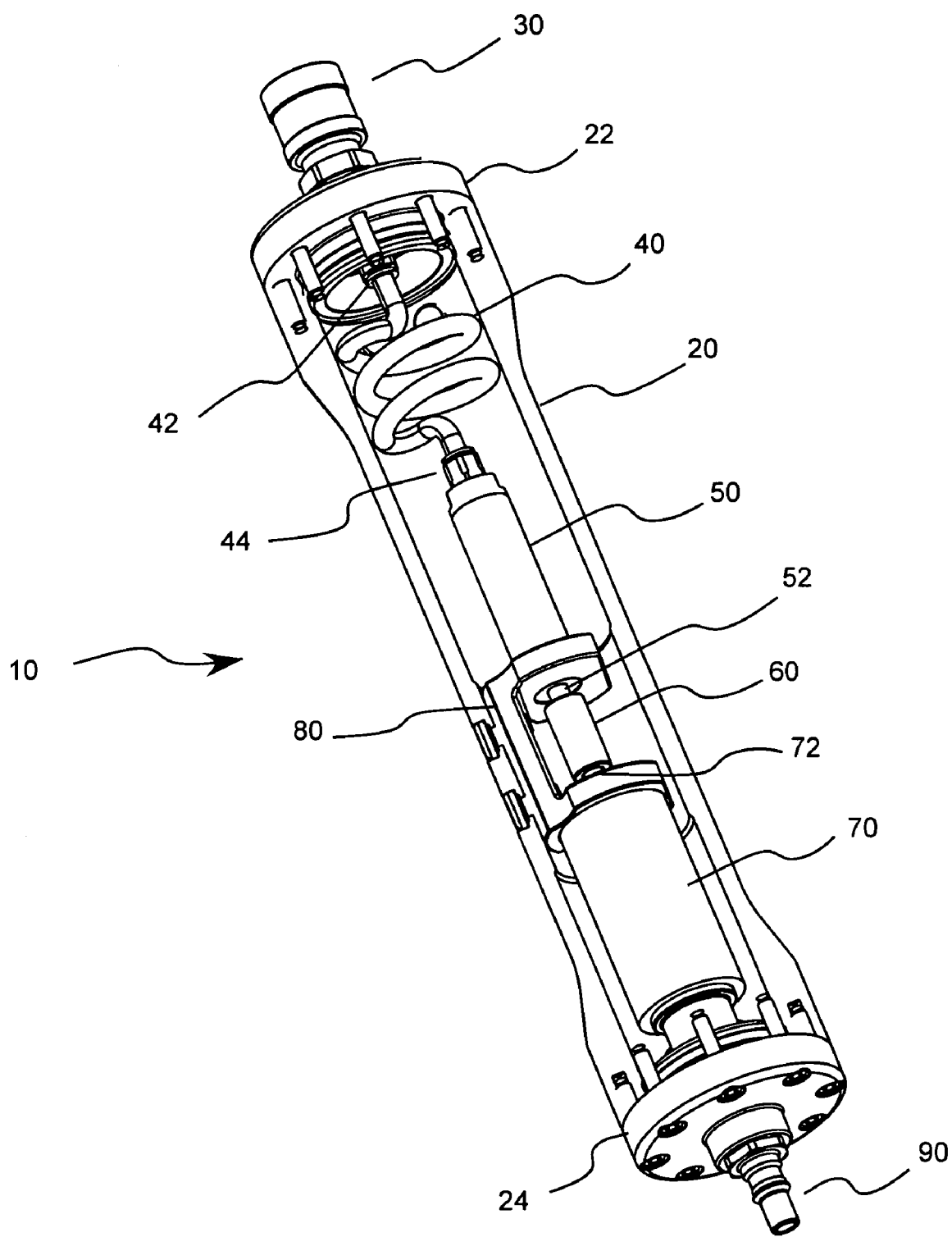
FIG. 1 illustrates a cutaway perspective view of one embodiment of a generator system of the present invention.
Figure 2:
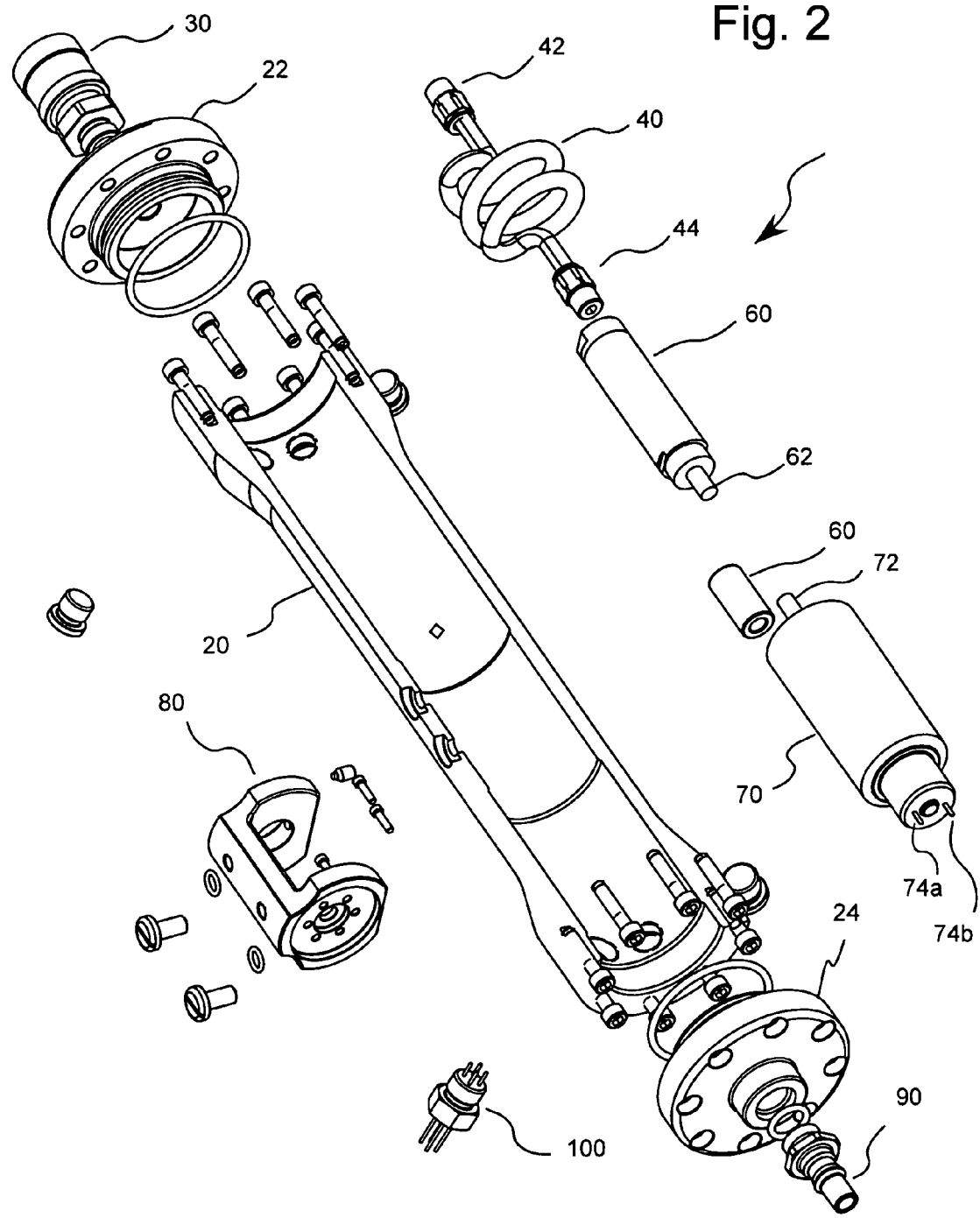
FIG. 2 illustrates an exploded or disassembled perspective view of the generator system of FIG. 1.
Figure 3:
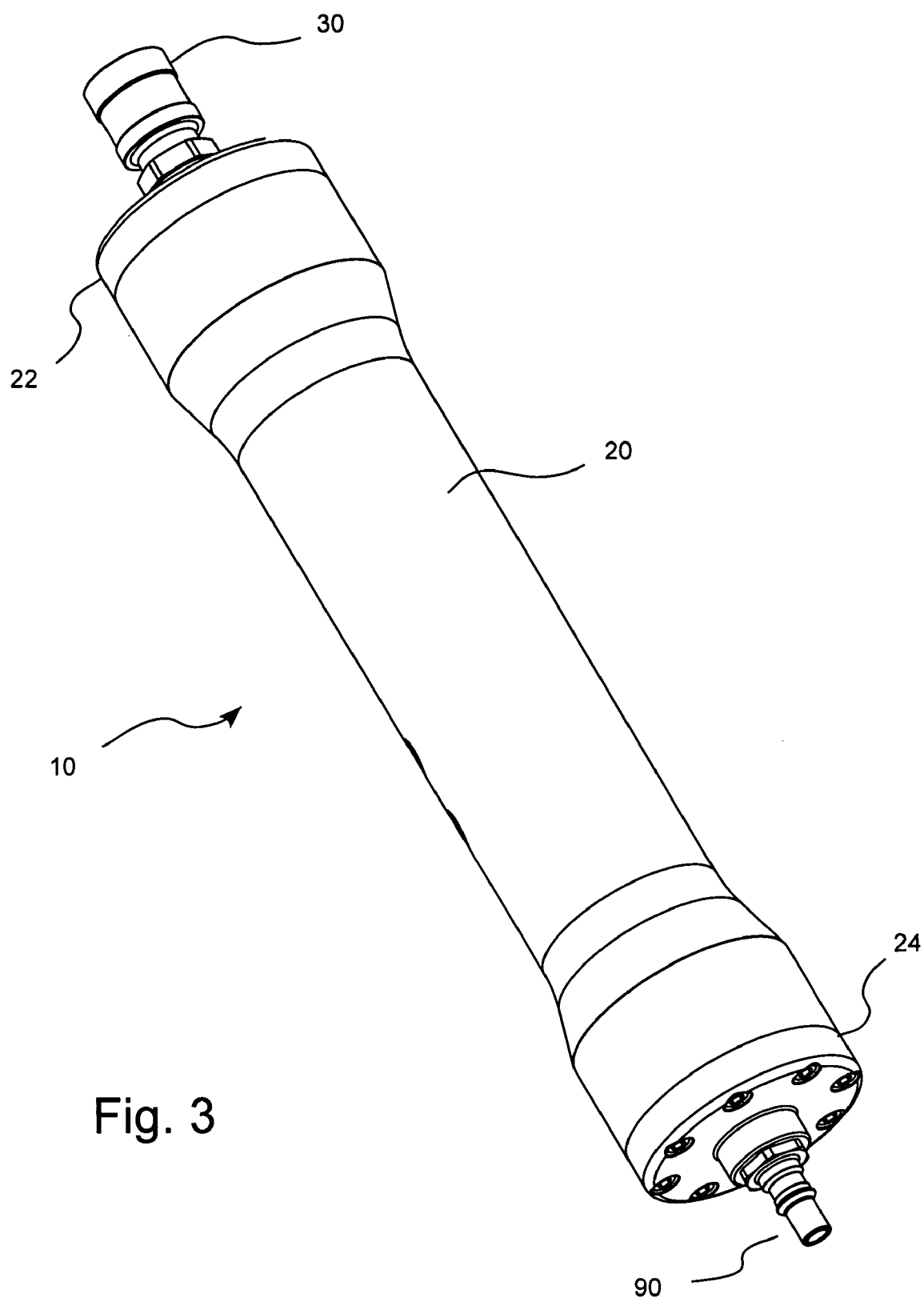
FIG. 3 illustrates a perspective view of the generator system of FIG. 1.

FIGS. 1 through 4 illustrate an embodiment of a generator system 10 of the present invention which includes a housing having a generally cylindrical housing section 20. The housing also includes a first end section 32 and a second end section 24. An inlet port 30 is provided through which pressurized gas (for example, compressed air from a cylinder 210 illustrated in FIG. 4) enters housing 20. Inlet port 30 is in fluid connection with tubing 40 via a connector 42. Tubing 40 is also in fluid connection with an air turbine or air motor 50 via a connector 44. An example of a turbine suitable for use in the present invention is Model MMF 0700 available from Micro Motors, Inc. of Santa Ana, Calif. Air turbine 40 includes a shaft 52 which is caused to rotate by the pressurized gas flowing through air turbine 50. The pressurized or compressed gas which causes rotation of shaft 52 exits turbine 50 into housing 20, which is preferably sealed (other than inlet port 30 and an outlet port 90 discussed below) to prevent loss of air to the surrounding environment.

Turbine 50 is connected to generator 70 via a coupling 60, which connects shaft 52 to shaft 72 of generator 70. An example of a suitable generator for use in the present invention is the model RE 35 DC motor (rated at 90-watts) available from Maxon Precision Motors of Burlingame, Calif. In the embodiment of FIGS. 1 through 4, turbine 50 and generator 70 are in operative connection with, and held in position by, a hub or frame 80. In one embodiment, coupling 60 was a flexible coupling to accommodate misalignment of shaft 52 with shaft 72.

The fields of generator 70 depend upon the current from the armature of the generator for magnetization. Because the current developed by the generator increases in direct proportion to its speed, the fields become stronger as the speed increases and, correspondingly, the armature generates more current. A regulator can be provided to prevent excessive current or voltage overload. Such a regulator can either function to regulate voltage or to regulate current. In general, a voltage regulator regulates the voltage in the electrical system and prevents excessive voltage, which can cause damage to the electrical units of the system and/or overcharge a battery. A current regulator is a current limiter, which prevents the generator output from increasing beyond the rated output of the generator. In the embodiment of FIGS. 1 through 5, a voltage regulator (see FIG. 5) was included to limit the voltage produced by generator 70 to approximately 7 volts.

Generator 70 includes terminals 74a and 74b through which electrical energy can be transmitted to electrical components or loads outside of housing 20. Generator system 10 can, for example, include at least one feedthrough connector 100 (which is preferably in sealed connection with housing 20) to transmit electrical energy outside of housing 20. An example of a feedthrough connector suitable for use in the present invention is the SO8-SS-150-2P-PC24-6-6 threaded feedthrough connector available from Pave Technology Co. of Dayton, Ohio. Feedthrough connector 100 includes two pairs of wires. One pair of wires can be used to transmit electricity through housing 20 from generator 70, while, for example, the second pair can be connected to a pressure transducer (not shown) within housing to provide a reading of pressure within housing 20. Additional or alternative sensors or other electrical components can be provided within housing 20 and signals communicated through one or more feedthrough connectors.

Figure 4:
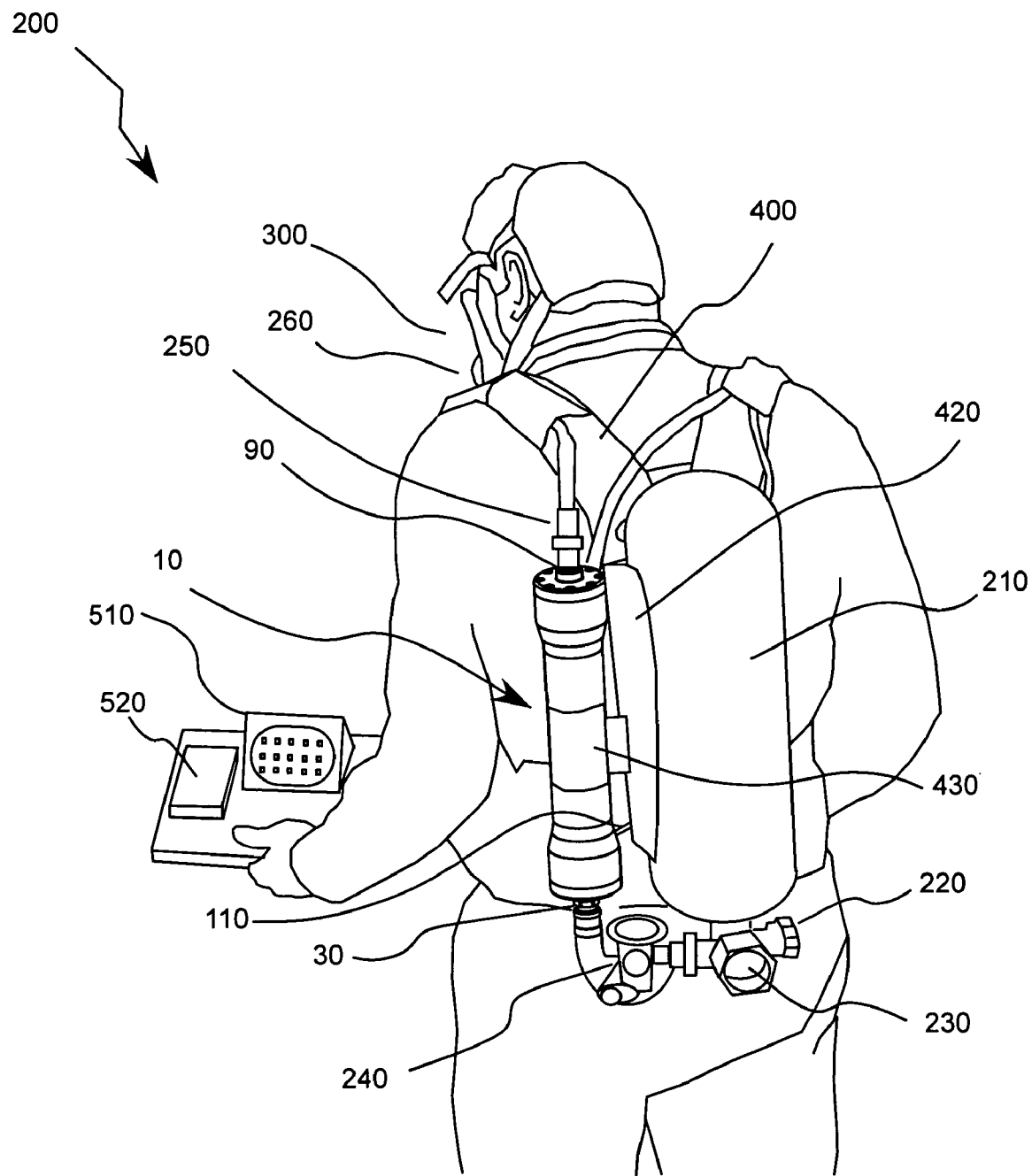
FIG. 4 illustrates a perspective view of a respiration system/SCBA including the generator system of FIG. 1.
Figure 5:
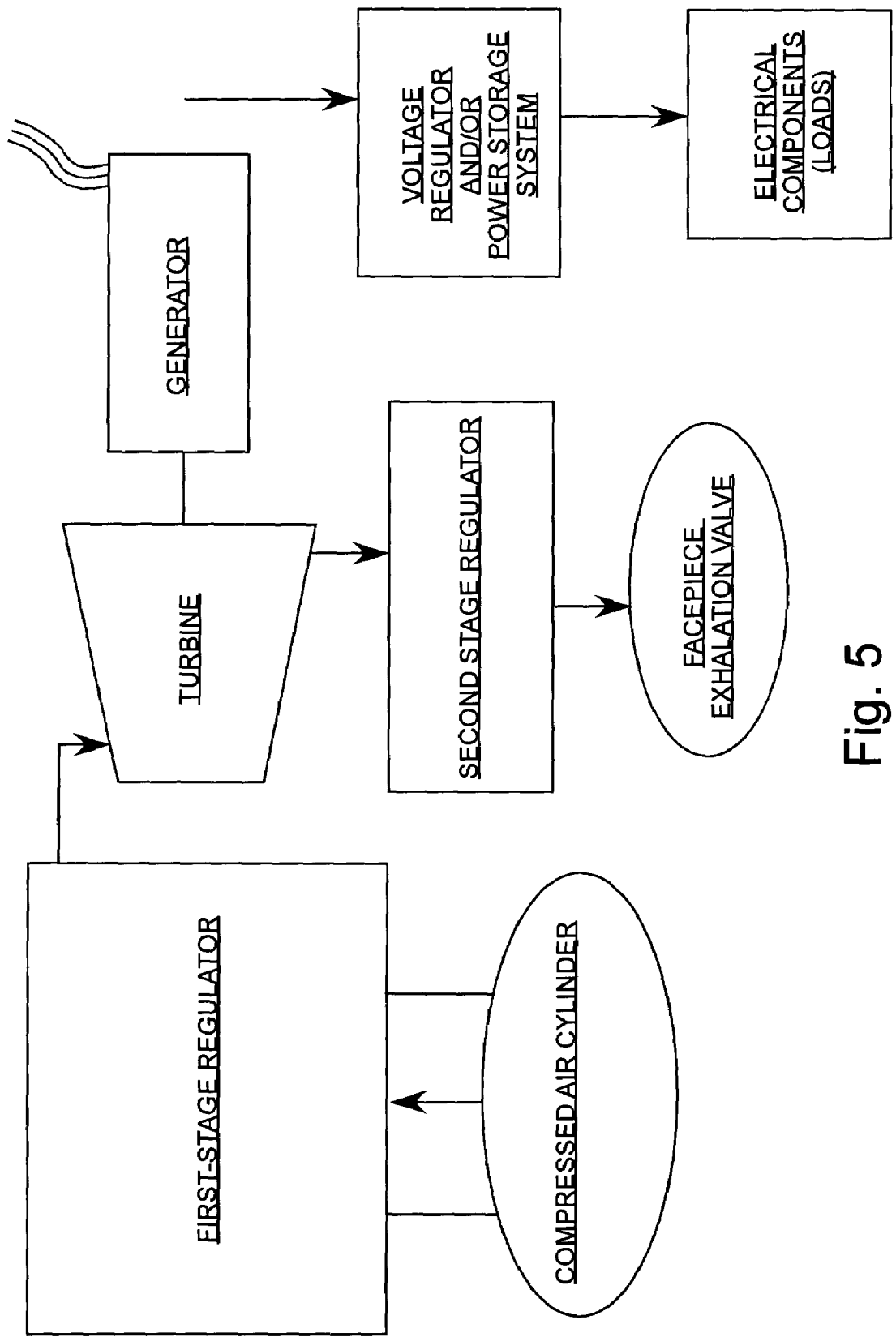
FIG. 5 is a schematic diagram of the respiration system of FIG. 5.

As illustrated in FIG. 4, generator system 10 is readily incorporated into a respiration system, SCBA or SCUBA. In that regard, FIG. 4 illustrates an individual wearing a respiration system/SCBA 200 including compressed air cylinder 210. The pressure of the air in the cylinder 210 can, for example, be in the range of approximately 2200 to 4500 psi. A control valve 220 is provided to open and close the outlet from cylinder 210. Gauge 230 provides an indication of the pressure of the air within cylinder 210. Cylinder 210 is in fluid connection with a first-stage regulator 240. In the studies of the present invention, first-stage regulator 240 was used to drop the pressure of air entering inlet 30 (which is in fluid connection with first-stage regulator 240) of generator system 10 to approximately 80 psi. Outlet 90 of generator system 10 is in fluid connection with a second-stage regulator 260 which was used to drop the pressure of the air entering facepiece 300 to approximately 1.5 inches of water (approximately 0.054 psig).

As described above, a self contained breathing apparatus or SCBA is a device or system used to enable breathing in environments which are immediately dangerous to life and health. For example, firefighters wear an SCBA when fighting a fire. The second stage regulator of an SCBA system typically has an inlet valve which controls the flow of air through the regulator in response to the respiration of the user. Such respiration-controlled regulator assemblies are disclosed, for example, in U.S. Pat. Nos. 4,821,767 and 5,016,627, the disclosures of which are incorporated herein by reference.

Typically, a diaphragm divides the regulator assembly into an inner chamber having a pressure corresponding to the pressure within facepiece of the SCBA and an outer chamber having a pressure corresponding to the surrounding environment, which is typically ambient pressure. The diaphragm is coupled to an actuating mechanism which opens and closes the inlet valve. The user's respiration creates a pressure differential between the inner and outer chambers of the regulator assembly which, in turn, causes displacement of the diaphragm thereby controlling (that is, opening and closing) the inlet valve mechanism. As a result, such regulators are often called pressure demand regulators.

The facepiece of the SCBA is preferably maintained at a positive pressure as compared to the surrounding environmental pressure to prevent toxic gases and vapors in the environment from entering the facepiece. This positive pressure can, for example, be facilitated by biasing the diaphragm with a spring or other biasing element.

Figure 6:
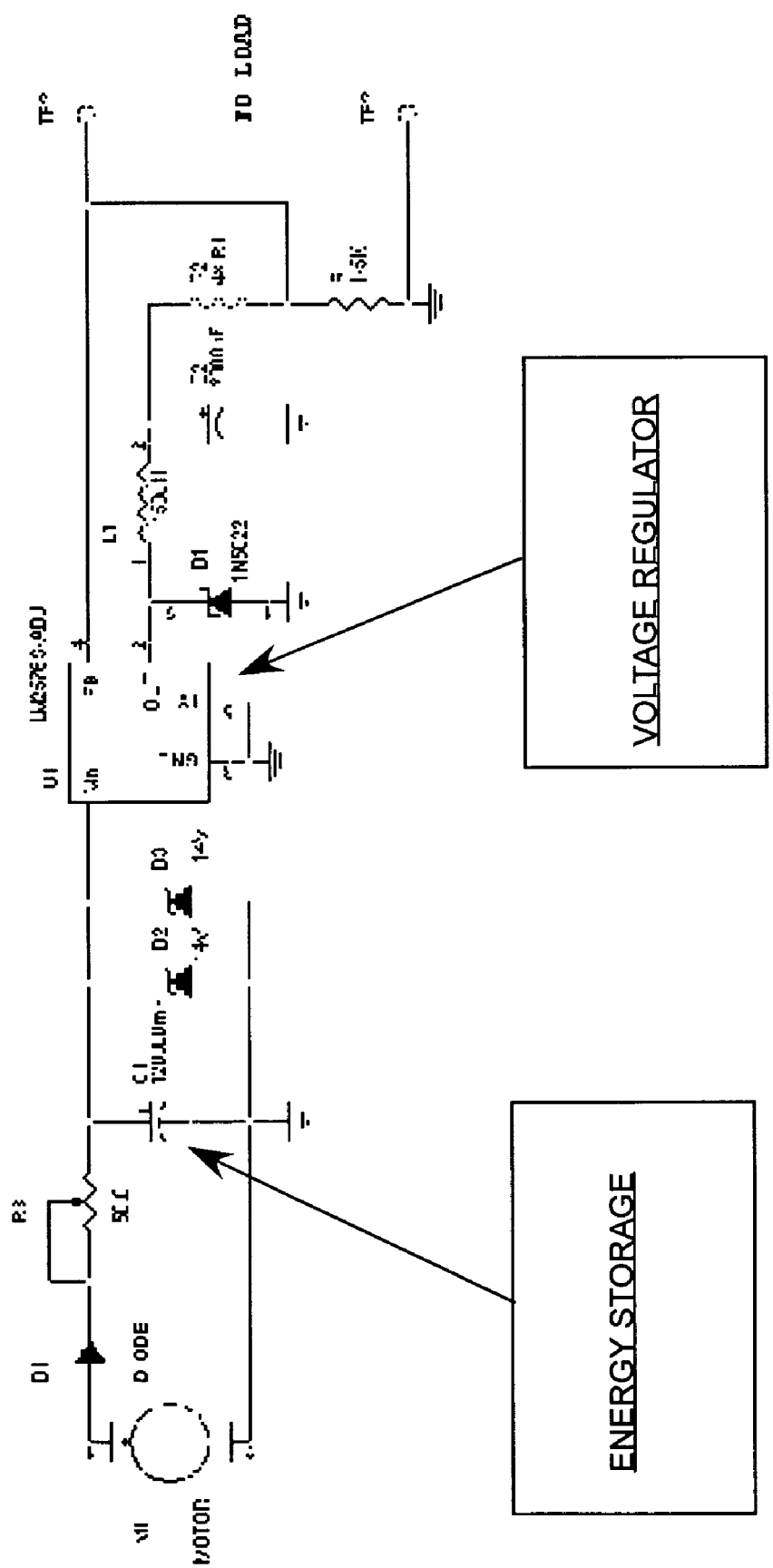
FIG. 6 illustrates an embodiment of circuitry for use in connection with the generator systems of the present invention including an energy storage system and a voltage regulator.

Because the inlet valve mechanism of the second-stage regulator is controlled by respiration of the user, there is no flow of air through the turbine during an exhalation cycle of the user. Energy storage circuitry as illustrated in FIG. 6 provides a mechanism to continue to satisfy power requirements during an exhalation cycle, when turbine 50 and generator 70 are idle. Additionally, battery charging circuitry and batteries can be provided to enable long term storage of excess energy.

In FIG. 4, the user of respiration system/SCBA 200 is wearing a harness 400 that supports a compressed air container or cylinder 210 in a cylinder support 420. Generator system 10 is also attached to harness 400 via a bracket 430. Wires 110, in electrical connection with feedthrough connector 100 of generator system 10 are connected to, for example, one or both of representative loads 510 (for example, a 15-LED bank) and 520 (for example, a DRAGONFLY® Personal Alert Safety System (PASS), available from Mine Safety Appliances Company of Pittsburgh Pa.). PASS devices are discussed, for example, in U.S. Pat. Nos. 6,198,396, 5,781,118 and 4,688,025, assigned to the assignee of the present invention, the disclosure of which are incorporated herein by reference.

Figure 7:
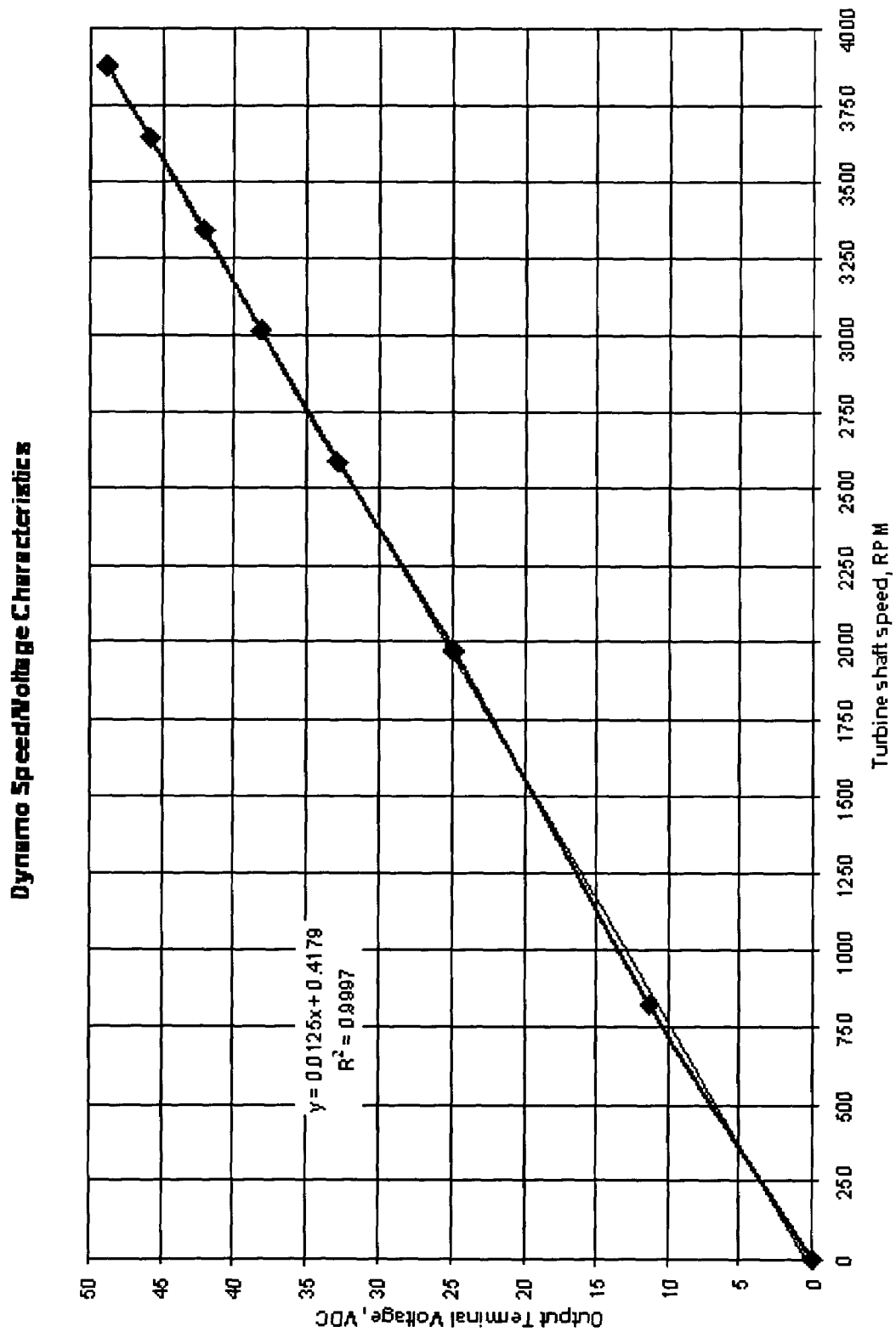
FIG. 7 illustrates a plot of the generator/dynamo voltage output of the generator system of FIG. 1 as a function of turbine speed. This characteristic is measured at the open circuit condition at the generator terminals
Figure 8:
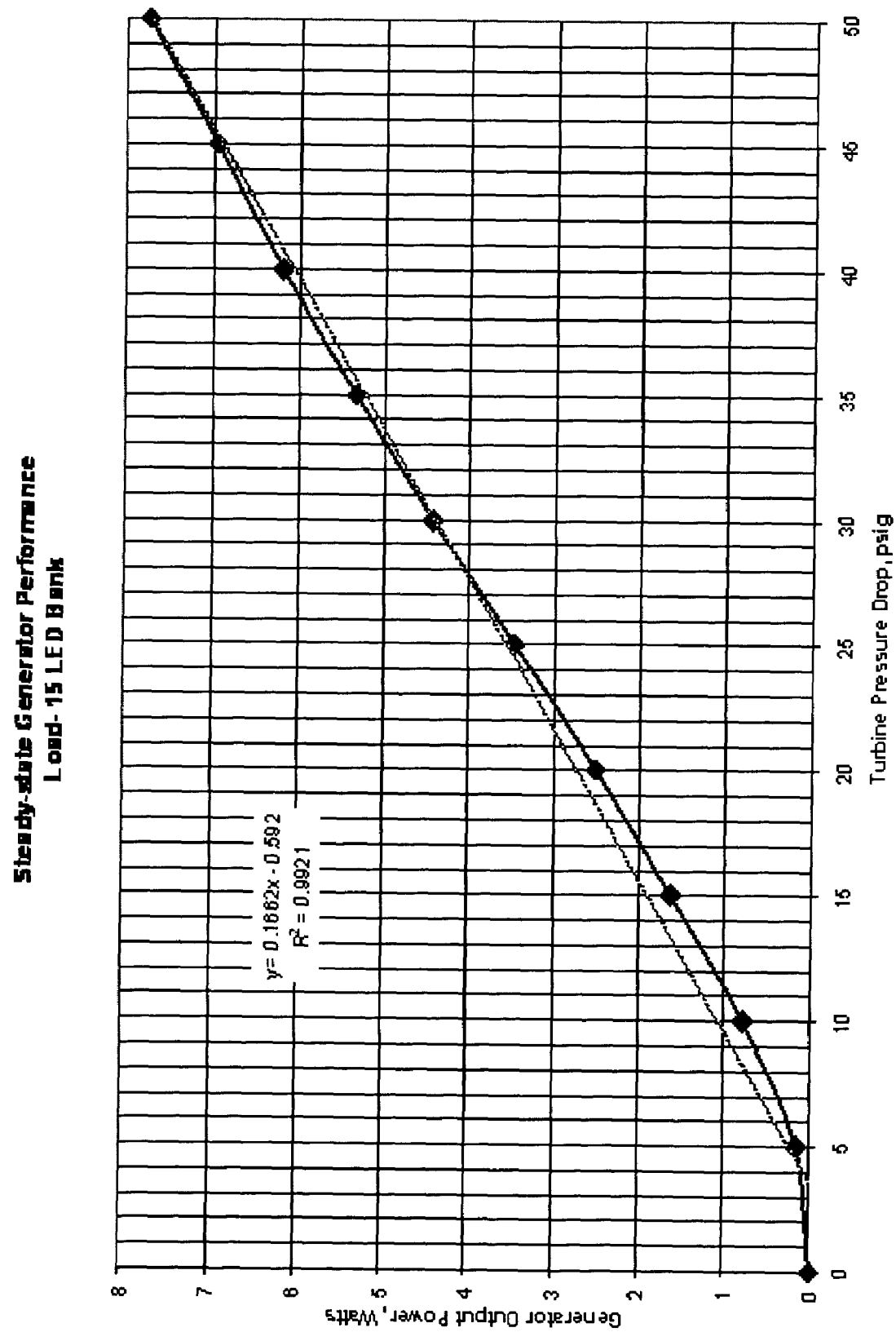
FIG. 8 illustrates the power output of the generator/dynamo as a function of pressure drop across the turbine for with a 15-LED bank load.
Figure 9:
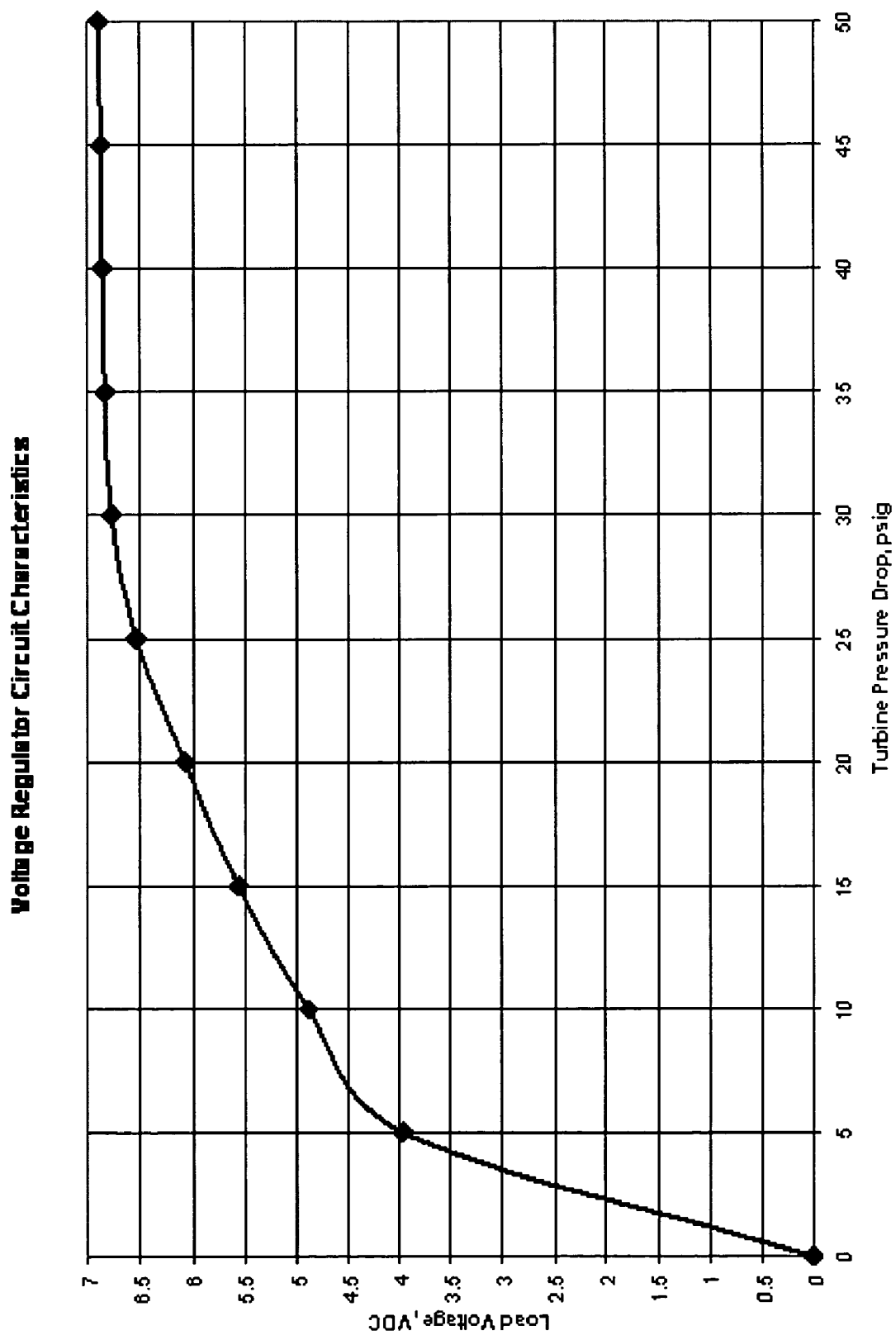
FIG. 9 illustrates the voltage output curve as a function of pressure drop across the turbine for the voltage regulator circuitry of FIG. 6.
Figure 10:
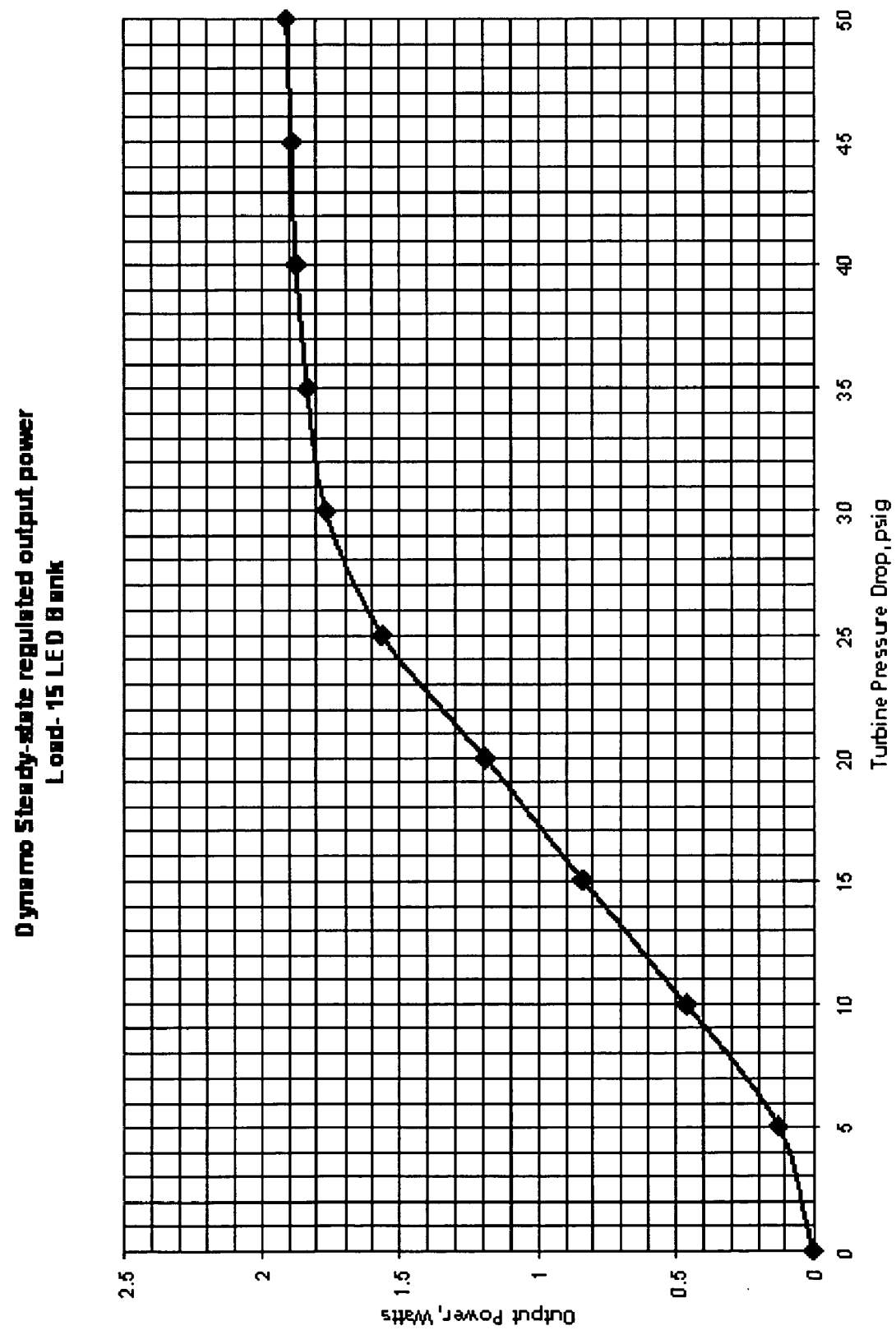
FIG. 10 illustrates the regulated output of the generator/dynamo as a function of pressure drop across the turbine with a 15-LED bank load.

FIG. 7 illustrates a plot of the voltage output of generator 70 (a Maxon RE 35 DC motor in the studies of the present invention) of FIG. 1 as a function of the speed of turbine 50. The current output of generator 70 as a function of pressure drop across the turbine with 15-LED bank load 510 in electrical connection with generator 70 is illustrated in FIG. 8. FIG. 9 illustrates the voltage output curve as a function of pressure drop across the turbine for the voltage regulator circuitry of FIG. 6. Once again, the voltage was limited at approximately 7 volts. FIG. 10 illustrates that a steady state average continuous power output of approximately 2 watts was obtained from generator 70 with 15-LED bank load 510 in electrical connection therewith.

Figure 11:
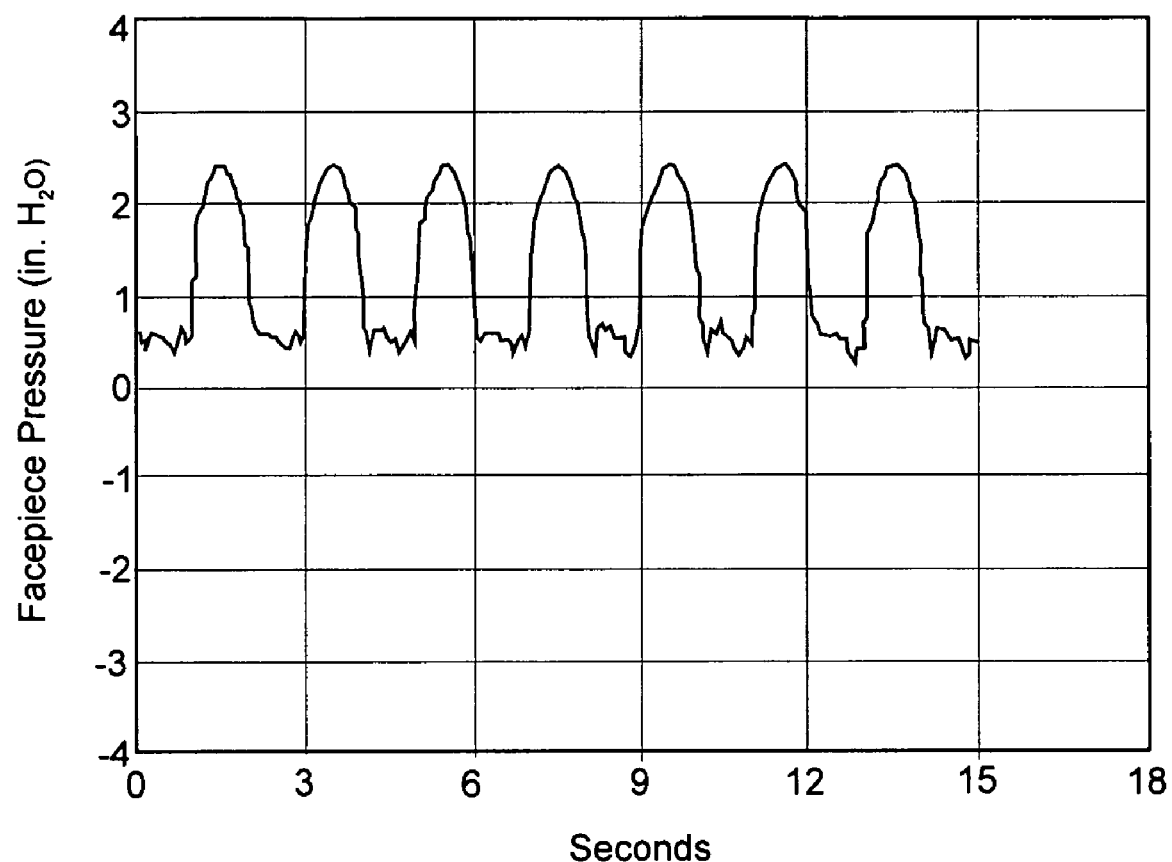
FIG. 11 illustrates the results of a breathing study of the respiration system of FIG. 5 in which facepiece pressure is plotted as a function of time.

It was shown that both 15-LED bank 510 and PASS device 520 could be powered by generator system 10 during respiration while complying with the National Institute for Occupational Safety and Health (NIOSH) breathing protocol using the FIREHAWK® MMR SCBA available from Mine Safety Appliances Company of Pittsburgh, Pa. In that regard, FIG. 11 illustrates the results of a breathing study of the SCBA of FIG. 5 in which facepiece pressure is plotted as a function of time. The minimum positive facepiece pressure was approximately 0.3 in of $H_2O$, while the maximum positive facepiece pressure was approximately 2.4 in of $H_2O$.

In addition to the above studies, generator system 10 was used to power an EVOLUTION® 5000 thermal imaging camera on bypass flow (that is, continuous flow of air from cylinder 210), delivering approximately 6 watts of power. Similarly, generator system 10 was also used to power a 6-cell MAGLITE® Flashlight on bypass flow, delivering approximately 6 watts of power.

As clear to one skilled in the art, the power output from generator 70 can be increased by spinning shaft 72 more quickly. The output from generator 70 can, for example, be increased by increasing the pressure drop across turbine 50. To maximize pressure at inlet 30, inlet 30 can be directly connected to cylinder 210 without an intervening regulator. Generator system 10 can itself act as a regulator in the fluid path of SCBA 200.

Depending upon the size of the outlet orifice of turbine 50, problems can arise in providing sufficient air to facepiece 300, particularly at high respiration rates. The free internal volume of housing 20 can reduce this effect by acting as an air capacitor or accumulator. Moreover, a bypass valve can be provided so that air bypasses turbine 50 in cases of heavy air demand (for example, during rapid respiration).

Figure 12:
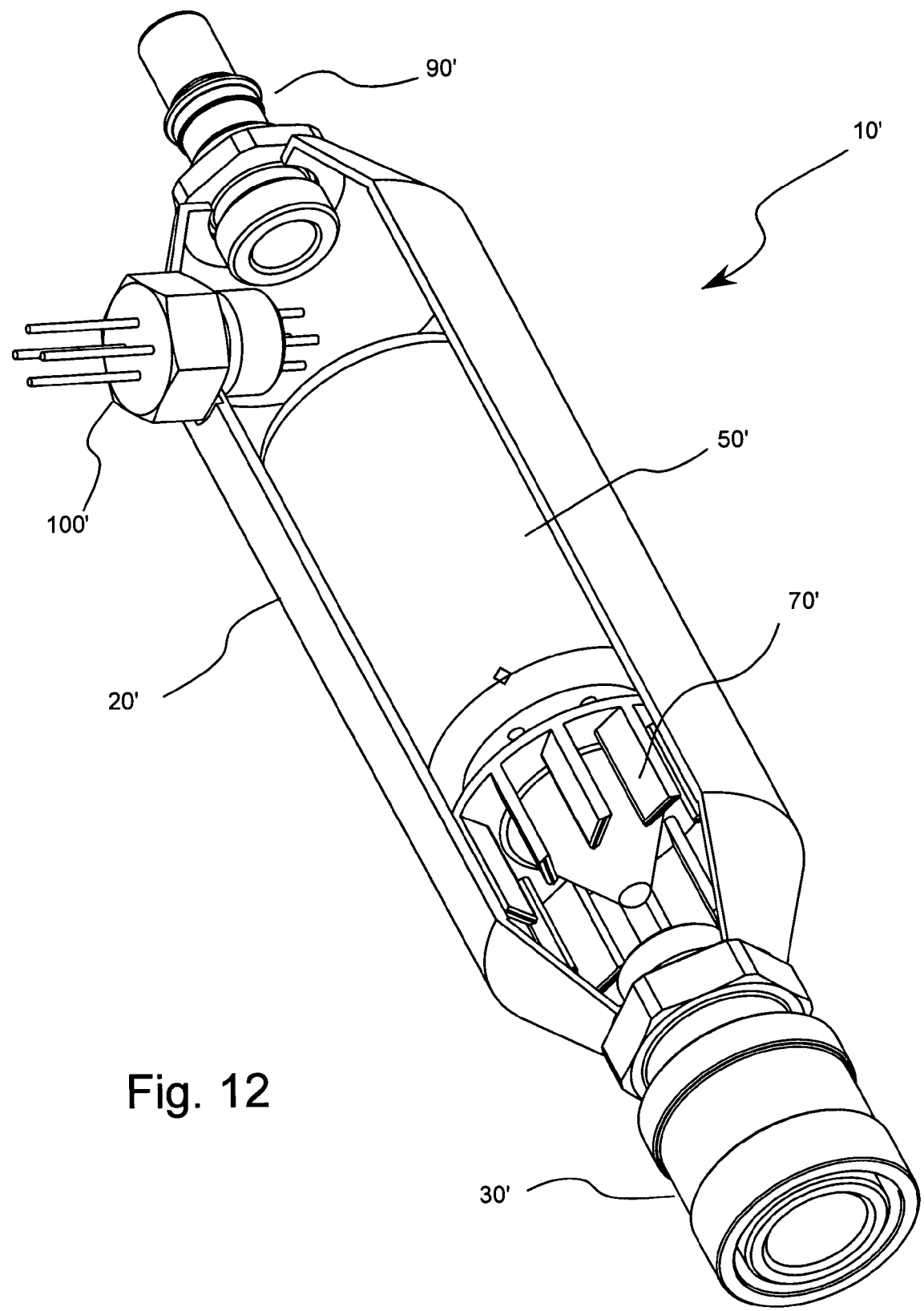
FIG. 12 illustrates a cutaway perspective view of another embodiment of a generator system of the present invention.
Figure 13:
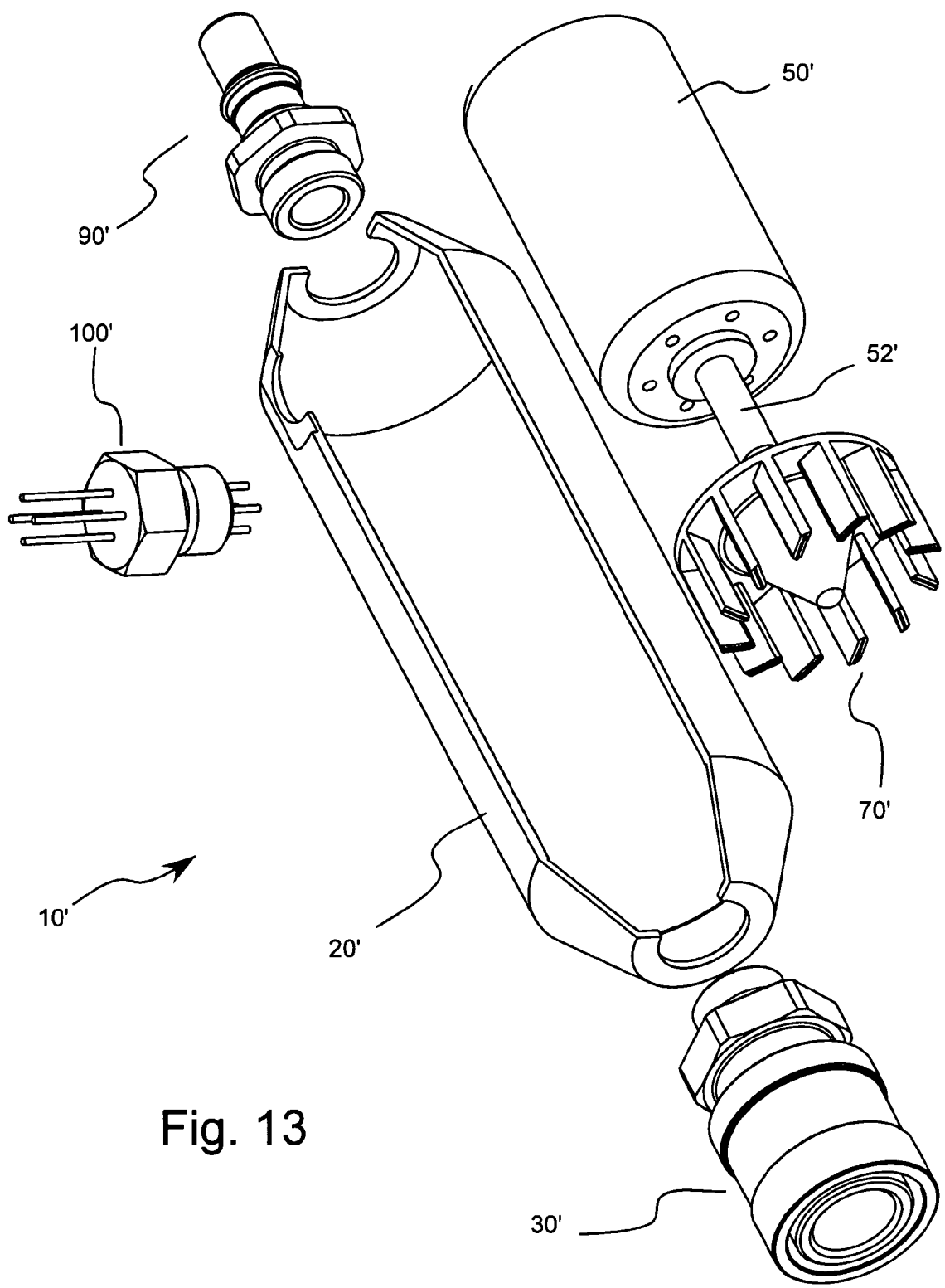
FIG. 13 illustrates an exploded or disassembled view of the generator system of FIG. 5.

FIGS. 12 and 13 illustrate an embodiment of a generator system 10' of the present invention in which a shaft 52' (see FIG. 13) of a generator 70' is caused to rotate by a propeller or vane 50'. In that regard, pressurized air enters housing 20 via inlet 30' to cause rotation of vane 50', which is in operative connection with shaft 72'. Air exits housing 20' via outlet 90' which is in fluid connection with a facepiece (not shown). A feedthrough connector 100', similar in design and operation to feedthrough connector 100 is provided to transmit electricity produced by generator 70 outside of housing 20'.

Figure 14:
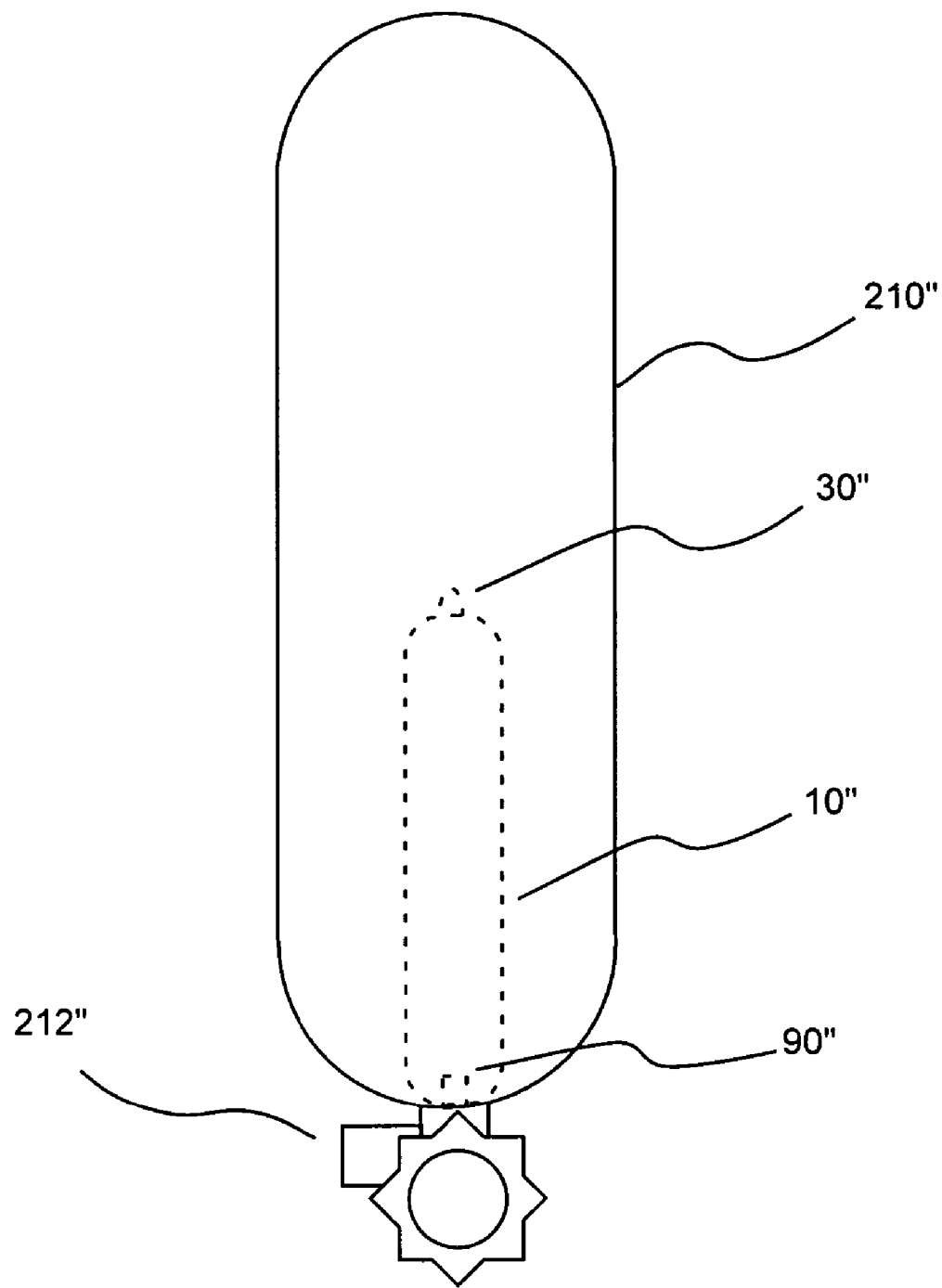
FIG. 14 illustrates another embodiment of a generator system of the present invention in which the generator system is formed inside a pressurized gas container.
Figure 15:
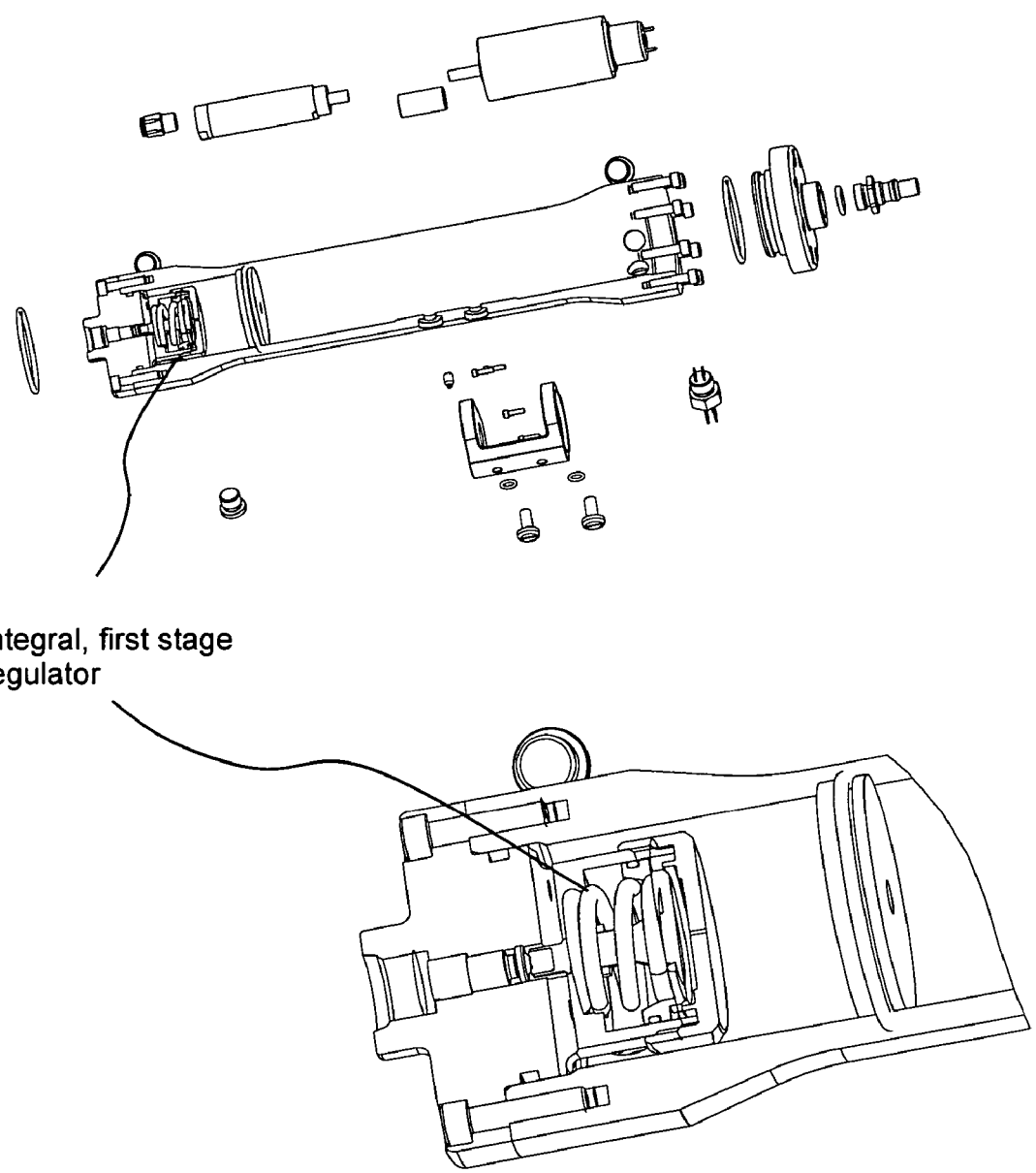
FIG. 15 illustrates an embodiment of a generator system of the present invention incorporating a first stage regulator that can be used within a pressurized gas container as illustrated in FIG. 14.

The generator systems of the present invention have not been optimized for size, power output, air delivery etc. For example, decreasing the size of the generator system can be achieved by altering the positions of the turbine and the generator. The sizes, shapes and geometries of the components of the generator systems of the present invention can be readily altered. Moreover, a generator system 10" of the present invention can be placed within a compressed gas cylinder 210" as illustrated in FIG. 14. In this embodiment, inlet 30" of generator system 10" is in fluid connection with the internal volume of cylinder 210", while outlet 90" is in fluid connection with outlet 212" of cylinder 210". FIG. 15 illustrates an embodiment of a generator system of the present invention incorporating a first stage regulator that can be used within a pressurized gas container as illustrated in FIG. 14. In the embodiment of FIGS. 14 and 15, air (or other gas) from the gas cylinder can enter the generator system inlet at 4500 psig and exit the generator system (for example, for respiration) at a pressure of 80 psig. In many other respects, the operation of the generator system of FIG. 15 is similar to the operation of generator system 10 described above.

Although the generator systems of the present invention have been described in connection with use in an SCBA (or indeed the underwater equivalent, a SCUBA), one skilled in the art understands that the generator systems of the present invention can be used in connection with any type of compressed fluid which is to be delivered to another device or system. The generator systems of the present invention have little if any effect upon the nature of the fluid to be delivered and thus do not effect its final use, whether for consumption during respiration, consumption as a fuel etc.

The foregoing description and accompanying drawings set forth preferred embodiments of the invention at the present time. Various modifications, additions and alternative designs will, of course, become apparent to those skilled in the art in light of the foregoing teachings without departing from the scope of the invention. The scope of the invention is indicated by the following claims rather than by the foregoing description. All changes and variations that fall within the meaning and range of equivalency of the claims are to be embraced within their scope.

What is claimed is:

1. A breathing system for a user, comprising:
 a container to store a gas under pressure, the gas comprising oxygen, the container comprising an outlet through which the gas exits the container;
 a generator system comprising a generator within a housing, the generator in operative connection with the container outlet such that energy is supplied to the generator by the pressurized gas and the generator converts the energy supplied by the pressurized gas to electrical energy without limiting the flow of pressurized gas to the user;
 the electrical energy being transmitted outside the housing to operate an external load;
 a fluid path in connection with the generator through which pressurized gas passes after providing energy to the generator; and
 a respiration facepiece in fluid connection with the fluid path.

2. The breathing system of claim 1 wherein the generator system comprises a housing comprising an inlet in fluid connection with the container outlet and an outlet in fluid connection with the fluid path.

3. The breathing system of claim 2 wherein the generator system further comprises a mechanism for rotating a shaft of the generator.

4. The breathing system of claim 3 wherein the mechanism is a turbine in fluid connection with the housing inlet.

5. The breathing system of claim 3 wherein the mechanism is a vane in operative connection with the housing inlet.

6. The breathing system of claim 2 wherein the generator system further comprises a feedthrough connector on the housing to transmit electricity from the generator to outside of the housing.

7. The breathing system of claim 1 wherein the generator system further comprises an energy storage mechanism.

8. The breathing system of claim 1 wherein the generator further comprises a voltage regulating mechanism.

9. The breathing system of claim 1 wherein the generator system is positioned within the gas container.

10. The breathing system of claim 1 wherein the generator system is positioned external to the gas container.

* * * * *